No. 688,960. Patented Dec. 17, 1901.
G. R. MOON.
GASOLENE OR GAS STOVE.
(Application filed June 17, 1901.)

(No Model.)

WITNESSES:
H. B. Bradshaw
A. L. Phelps

INVENTOR
George R. Moon
BY
Shepherd
ATTORNEY

THE NORRIS PETERS CO., PHOTO-LITHO., WASHINGTON, D. C.

UNITED STATES PATENT OFFICE.

GEORGE R. MOON, OF COLUMBUS, OHIO.

GASOLENE OR GAS STOVE.

SPECIFICATION forming part of Letters Patent No. 688,960, dated December 17, 1901.

Application filed June 17, 1901. Serial No. 64,792. (No model.)

*To all whom it may concern:*

Be it known that I, GEORGE R. MOON, a citizen of the United States, residing at Columbus, in the county of Franklin and State of Ohio, have invented a certain new and useful Improvement in Gasolene or Gas Stoves, of which the following is a specification.

My invention relates to the improvement of gasolene-stoves, and has particular relation to that class of gasolene-stoves in which a gasolene-burner is adapted to supply heat through a stove-stop opening.

The objects of my invention are to so construct a stove-top and arrange the burner with reference thereto as to prevent the heat from the burner being deflected beneath the stove-top and insure the distribution of the heat beneath the vessel to be heated and to produce certain improvements in details of construction and arrangement of parts, which will be more fully pointed out hereinafter. These objects I accomplish in the manner illustrated in the accompanying drawings, in which—

Figure 1:
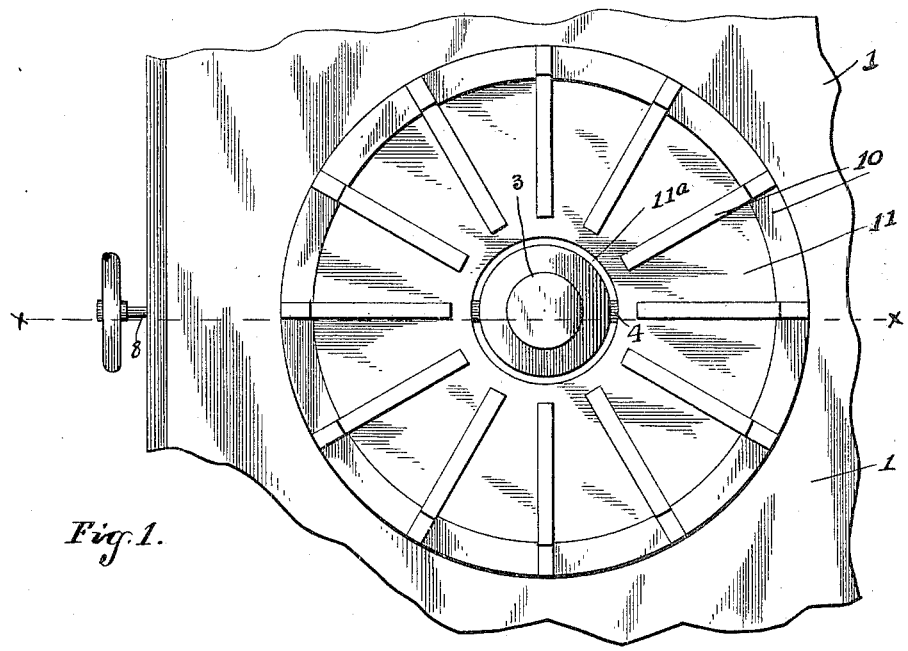
Figure 2:
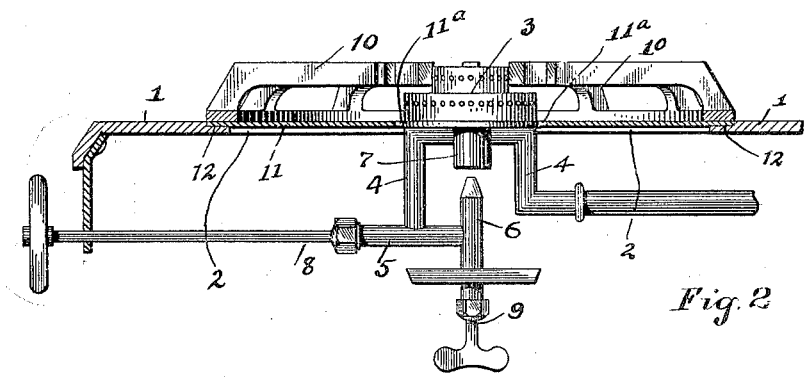

Figure 1 is a plan view of a portion of a stove-top having my improvement therein, and Fig. 2 is a sectional view on line $x$ $x$ of Fig. 1.

Similar numerals refer to similar parts throughout both views.

1 represents a horizontal stove-top, and 2 one of the openings which are ordinarily formed therein.

3 represents a gas or gasolene burner head, and 4 the gas or gasolene supply pipe, which leads to the usual horizontal supply-pipe valve tube or casing 5, which in turn connects with a vertical gas-discharging valve-tube 6, the latter being in the nature of a needle-point valve-casing and terminating centrally below a mixer 7, which leads into the burner-head 3. The supply of gas from the pipe 4 to the arm 5 is regulated by a valve 8, while the flow of gas from the upper end of the discharge-pipe arm 6 is regulated by a valve 9. This construction and arrangement of supply pipes and valves, however, is well known and does not form part of my present invention, as any suitable means for supplying gas to the mixing-chamber and burner-head may be employed. Ordinarily in stoves of this class the burner-head is supported below the stove-top opening 2, and said burner-head being of much less diameter than said stove-top opening the heat to a great extent is deflected downward beneath the stove-top and a suitable proportion thereof thus prevented from acting directly upon the bottom of the vessel to be heated and which is ordinarily supported upon an openwork frame or spider 10. In order to obviate this difficulty, I so arrange and support the burner-head 3 as to cause the same to project through the central portion of the stove-top opening 2 and loosely surround the base of the burner with a stove-top-opening filling or ring plate 11, the latter having its outer portion bearing in the usual lid-receiving recess 12 of the stove-top and having its central burner-receiving opening $11^a$ of such size as to provide a comparatively narrow air-space between the base of the burner and the filling-plate 11. The vessel-supporting frame or spider 10 may be mounted, as shown in the drawings, upon the filling-plate 11, so as to permit the support of the vessel above the burner-head.

From the construction above described it will be seen that owing to the fact that the burner is supported above the stove-top opening and that the latter is practically closed that proportion of the heat which is ordinarily deflected beneath the stove-top might come into contact with the filling 11, from which it is directed against the bottom of the vessel which may be supported upon the frame or spider 10. In this manner it will be seen that the waste of heat from a gas or gasolene burner may be comparatively slight and that a comparatively light or subdued flame at the burner will result in subjecting the bottom of the vessel to be heated to a high degree of heat.

Having now fully described my invention, what I claim, and desire to secure by Letters Patent, is—

In a gasolene or gas stove, the combination with the stove-top having an opening therein, of a gasolene or gas burner projected centrally above said opening and a ring-plate filling the greater portion of the space between said burner-base and the border of the stove-top opening and a vessel-supporting arm rising from said filling-plate and adapted to support a vessel above the burner, substantially as specified.

GEORGE R. MOON.

In presence of—
A. L. PHELPS,
W. L. MORROW.